United States Patent
Payyappilly et al.

(10) Patent No.: US 8,787,239 B2
(45) Date of Patent: Jul. 22, 2014

(54) METHODS AND APPARATUS FOR ENABLING RELAY-MODEL TETHERED DATA CALLS IN WIRELESS NETWORKS

(75) Inventors: Ajith T. Payyappilly, San Diego, CA (US); Lei Shen, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 1060 days.

(21) Appl. No.: 12/183,925

(22) Filed: Jul. 31, 2008

(65) Prior Publication Data
US 2009/0274088 A1     Nov. 5, 2009

Related U.S. Application Data

(60) Provisional application No. 61/049,261, filed on Apr. 30, 2008.

(51) Int. Cl.
- H04W 4/00 (2009.01)
- H04B 7/14 (2006.01)
- H04J 1/10 (2006.01)
- H04J 3/08 (2006.01)

(52) U.S. Cl.
USPC ............ 370/315; 370/313; 370/328; 370/338

(58) Field of Classification Search
USPC ................... 370/310, 315, 320.328, 338, 339
See application file for complete search history.

(56) References Cited

U.S. PATENT DOCUMENTS

| | | | |
|---|---|---|---|
| 2002/0176370 A1* | 11/2002 | Ohba et al. ................... | 370/252 |
| 2003/0235171 A1* | 12/2003 | Lundstrom et al. ........... | 370/338 |
| 2004/0160945 A1* | 8/2004 | Dong et al. ................... | 370/352 |
| 2005/0111394 A1* | 5/2005 | Jung et al. .................... | 370/312 |
| 2006/0174004 A1* | 8/2006 | Asthana ........................ | 709/225 |
| 2007/0116051 A1* | 5/2007 | Chen ............................ | 370/338 |
| 2007/0133476 A1* | 6/2007 | Li et al. ........................ | 370/335 |

(Continued)

FOREIGN PATENT DOCUMENTS

| | | |
|---|---|---|
| CN | 1344457 A | 4/2002 |
| CN | 1653773 A | 8/2005 |

(Continued)

OTHER PUBLICATIONS

International Search Report and The Written Opinion—PCT/US2009/042390, International Searching Authority—European Patent Office—Sep. 15, 2009.

(Continued)

*Primary Examiner* — Jenee Williams (57) ABSTRACT

A method and apparatus for enabling a data call in a wireless network comprising determining if the data call in a packet app is a relay model tethered data call; and determining if default link flow type Flow 1 is deactivated for the data call. In one aspect, one or more of the following is also included: determining if the type of the data call is CDMA 2000 1X, IS-95A/B, EVDO Rev. 0, EVDO Rev. A or EVDO Rev. B; determining the type of the packet app; requesting to deactivate default link flow type Flow 1; and determining if default link flow type Flow 1 is deactivated for the data call; and wherein the type of the packet app is of a default packet app (DPA), a multi-flow packet app (MPA), an enhanced multi-flow packet app (EMPA) or a multi-link multi-flow packet app (MMPA).

9 Claims, 8 Drawing Sheets

(56) References Cited

U.S. PATENT DOCUMENTS

| | | | | |
|---|---|---|---|---|
| 2007/0153685 | A1* | 7/2007 | Moon et al. | 370/229 |
| 2007/0171910 | A1* | 7/2007 | Kumar | 370/338 |
| 2008/0089298 | A1* | 4/2008 | Anschutz et al. | 370/338 |
| 2008/0298447 | A1* | 12/2008 | Yoo et al. | 375/225 |
| 2010/0046444 | A1* | 2/2010 | Lin et al. | 370/329 |
| 2010/0329177 | A1* | 12/2010 | Murphy et al. | 370/328 |

FOREIGN PATENT DOCUMENTS

| | | |
|---|---|---|
| CN | 1703875 A | 11/2005 |
| JP | 2002538674 A | 11/2002 |
| JP | 2003523649 | 8/2003 |
| WO | WO0044183 | 7/2000 |
| WO | WO03088618 | 10/2003 |
| WO | WO03088619 | 10/2003 |
| WO | 2007146274 A2 | 12/2007 |

OTHER PUBLICATIONS

Taiwan Search Report—TW098114426—TIPO—Jan. 2, 2013.

* cited by examiner

METHODS AND APPARATUS FOR ENABLING RELAY-MODEL TETHERED DATA CALLS IN WIRELESS NETWORKS

CLAIM OF PRIORITY UNDER 35 U.S.C. §119

The present Application for Patent claims priority to Provisional Application No. 61/049,261 entitled Methods and Apparatus for Enabling Relay-Model Tethered Data Calls in Wireless Networks filed Apr. 30, 2008; and assigned to the assignee hereof and hereby expressly incorporated by reference herein.

FIELD

This disclosure relates generally to apparatus and methods for enabling tethered data calls. More particularly, the disclosure relates to enabling relay-model tethered data calls in wireless networks.

BACKGROUND

Wireless networks may be employed to transport data between various mobile users. In one example, the wireless network is based on the CDMA 2000 1xEVDO (evolution-data optimized) wireless standard for Internet data services. The CDMA 2000 1xEVDO wireless standard is employed by packet networks for wide area mobile use. The packet networks may be overlaid on existing CDMA 2000 1x or IS-95A/B networks to provide certain communication services such as Web browsing, file transferring, gaming, voice over IP (VoIP), video telephony, etc. The mobile user employs wireless broadband devices to access the Internet.

EMPA is an enhanced multi-flow packet application in EVDO Rev. A. MMPA is a multi-link multi-flow packet application in EVDO Rev. B. MMPA is a superset of EMPA. In EMPA and in MMPA Flow 1 relay-model tethered data calls, the terminal equipment (TE) expects to receive point-to-point protocol (PPP) packets from the upstream wireless network component (e.g., through the packet control function (PCF) from the packet data serving node (PDSN)) via the mobile station (MS) in the forward link. Instead, the TE receives Internet protocol (IP) packets from the MS. On the reverse link, the TE sends out PPP packets, but the downstream wireless network component (e.g., PDSN through the PCF) expects to receive IP packets creating an incompatibility in EMPA and MMPA Flow 1 relay-model tethered data calls due to the usage of IP over radio link protocol (RLP) over the wireless link, instead of PPP over the wireless link.

SUMMARY

Disclosed is an apparatus and method for enabling relay-model tethered data calls in wireless networks. According to one aspect, a method for enabling a data call in a wireless network comprising determining if the data call in a packet application (hereinafter "app") is a relay model tethered data call; and determining if default link flow type Flow 1 is deactivated for the data call.

According to another aspect, a method for enabling a data call in a packet app of a wireless network comprising determining if the type of the data call is CDMA 2000 1X, IS-95A/B or EVDO (evolution-data optimized); determining if the type of the data call is EVDO Rev. 0, EVDO Rev. A, or EVDO Rev. B; determining if the type of the packet app is one of a default packet app (DPA), a multi-flow packet app (MPA), an enhanced multi-flow packet app (EMPA) or a multi-link multi-flow packet app (MMPA); determining if the data call is a tethered data call or an embedded data call; determining if the data call is of a relay model or of a network model; requesting to deactivate default link flow type Flow 1; and determining if default link flow type Flow 1 is deactivated for the data call.

According to another aspect, a communication device comprising a processor and a memory, the memory containing program code executable by the processor for performing the following: determining if a data call in a packet app is a relay model tethered data call; and determining if default link flow type Flow 1 is deactivated for the data call.

According to another aspect, a communication device comprising a processor and a memory, the memory containing program code executable by the processor for performing the following: determining if the type of a data call in a packet app is one of CDMA 2000 1X, IS-95A/B, EVDO (evolution-data optimized) Rev. 0, EVDO Rev. A or EVDO Rev. B; determining if the type of the packet app is one of a default packet app (DPA), a multi-flow packet app (MPA), an enhanced multi-flow packet app (EMPA) or a multi-link multi-flow packet app (MMPA); determining if the data call is a tethered data call or an embedded data call; determining if the data call is of a relay model or of a network model; requesting to deactivate default link flow type Flow 1; and determining if default link flow type Flow 1 is deactivated for the data call.

According to another aspect, a mobile terminal for enabling a data call in a packet app of a wireless network comprising means for determining if the data call is of a relay model; means for determining if the data call is a tethered data call; means for determining if default link flow type Flow 1 is deactivated for the data call; and means for proceeding with the data call.

According to another aspect, a mobile terminal for enabling a data call in a packet app of a wireless network comprising means for determining if the type of the data call is one of CDMA 2000 1X, IS-95A/B, EVDO (evolution-data optimized) Rev. 0, EVDO Rev. A or EVDO Rev. B; means for determining if the type of the packet app is one of a default packet app (DPA), a multi-flow packet app (MPA), an enhanced multi-flow packet app (EMPA) or a multi-link multi-flow packet app (MMPA); means for determining if the data call is a tethered data call or an embedded data call; means for determining if the data call is of a relay model or of a network model; means for requesting to deactivate default link flow type Flow 1; and means for determining if default link flow type Flow 1 is deactivated for the data call.

According to another aspect, a computer-readable medium including program code stored thereon, comprising program code for determining if a data call in a packet app is of a relay model; program code for determining if the data call is a tethered data call; and program code for determining if the default link flow type Flow 1 is deactivated for the data call.

According to another aspect, a computer-readable medium including program code stored thereon, comprising program code for determining if the type of a data call in a packet app is one of CDMA 2000 1X, IS-95A/B, EVDO (evolution-data optimized) Rev. 0, EVDO Rev. A or EVDO Rev. B; program code for determining if the type of the packet app is one of a default packet app (DPA), a multi-flow packet app (MPA), an enhanced multi-flow packet app (EMPA) or a multi-link multi-flow packet app (MMPA); program code for determining if the data call is a tethered data call or an embedded data call; program code for determining if the data call is of a relay model or of a network model; program code for requesting to deactivate default link flow type Flow 1; and program code for determining if default link flow type Flow 1 is deactivated for the data call.

The present disclosure includes the advantage of allowing simultaneous support for both enhanced multi-flow packet app (EMPA) and multi-link multi-flow packet app (MMPA) for relay-model tethered data calls.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
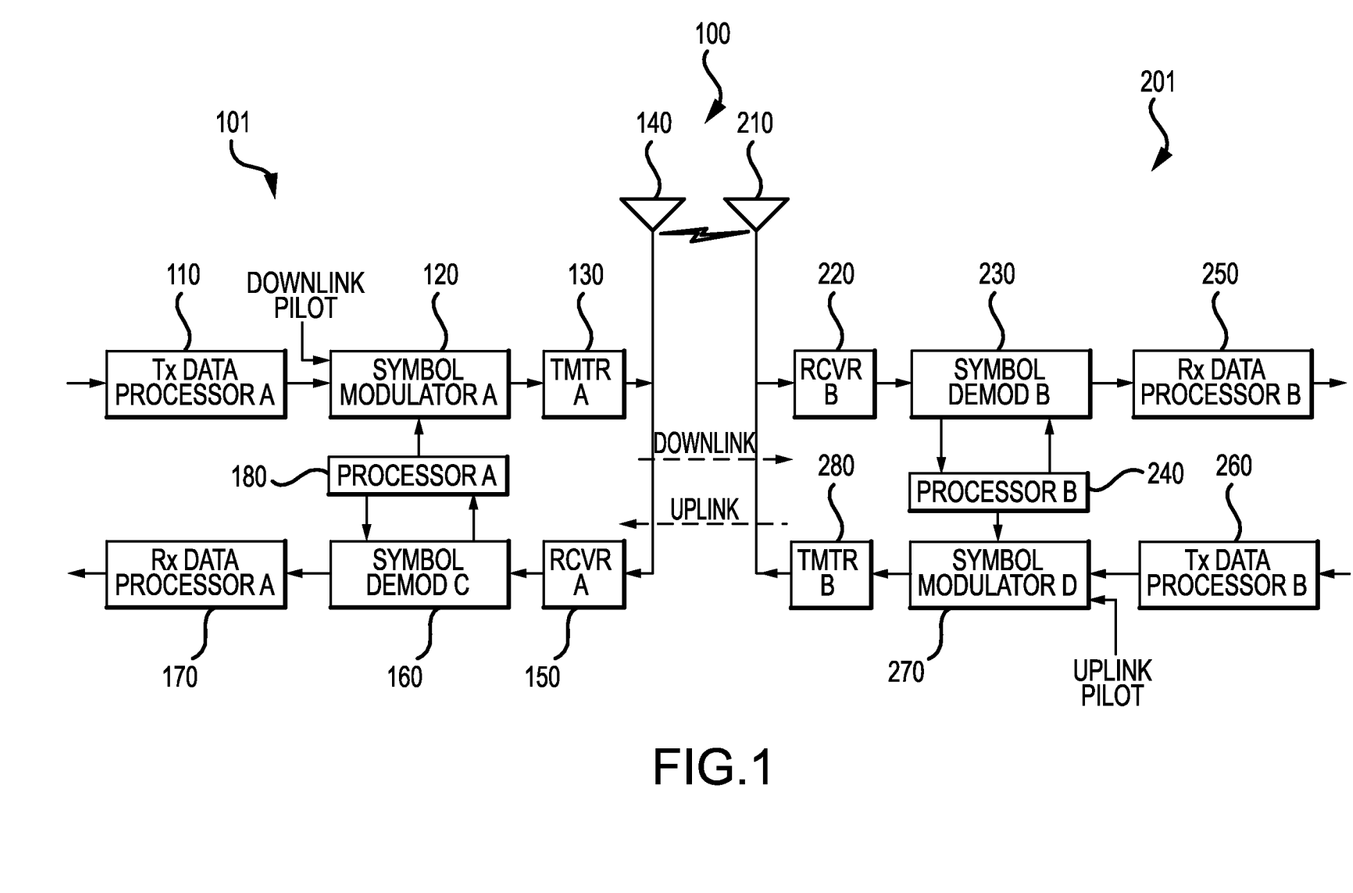
FIG. 1 is a block diagram illustrating an example base station/mobile terminal system.

FIG. 1 is a block diagram illustrating an example base station/mobile terminal system 100. One skilled in the art would understand that the example base station/mobile terminal system 100 illustrated in FIG. 1 may be implemented in an FDMA environment, an OFDMA environment, a CDMA environment, a WCDMA environment, a TDMA environment, a SDMA environment or any other suitable wireless environment.

The base station/mobile terminal system 100 includes a base station 101 (a.k.a. base station) and a mobile terminal 201 (a.k.a. wireless communication device). In the downlink leg, the base station 101 (a.k.a. base station) includes a transmit (TX) data processor A 110 that accepts, formats, codes, interleaves and modulates (or symbol maps) traffic data and provides modulation symbols (a.k.a. data symbols). The TX data processor A 110 is in communication with a symbol modulator A 120. The symbol modulator A 120 accepts and processes the data symbols and downlink pilot symbols and provides a stream of symbols. In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the mobile terminal 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (a.k.a. data symbols) outputted from the receiver unit B 220. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), interleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the mobile terminal 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from mobile terminal 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the base station 101 (a.k.a. base station) and at the mobile terminal 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the base station/mobile terminal system 100 is a multiple-access system. For a multiple-access system (e.g., FDMA, OFDMA, CDMA, TDMA, SDMA, etc.), multiple terminals transmit concurrently on the uplink leg. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
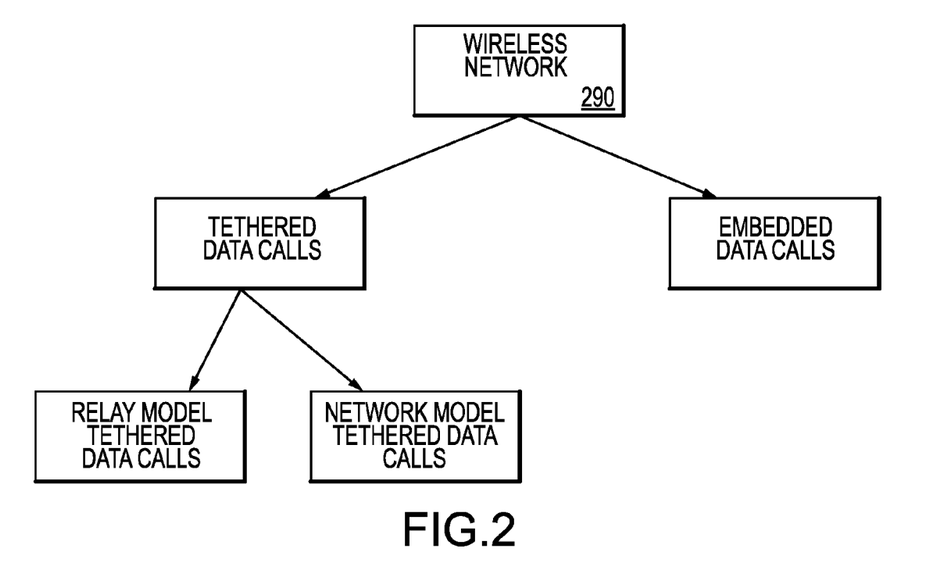
FIG. 2 illustrates an example of a hierarchy of data call types within a wireless network.

FIG. 2 illustrates an example of a hierarchy of data call types within a wireless network 290. The data transmission between two mobile users in the wireless network is categorized into two data call types, embedded data calls and tethered data calls, as shown in FIG. 2. These two data call types are distinguished by where the data calls are triggered. In embedded data calls, the data calls are triggered in the mobile station (MS). In tethered data calls, the data calls are triggered in a separate terminal equipment (TE), e.g., laptop computer, personal digital assistant (PDA), personal computer, etc. In one aspect, a mobile terminal includes a mobile station (MS) and terminal equipment (TE). In embedded data calls, the Internet protocol suite (transmission control protocol/Internet protocol (TCP/IP)) stack software runs on the mobile station (MS) itself. In tethered data calls, the TCP/IP stack software runs on the terminal equipment (TE), and the mobile station (MS) functions as a data modem to connect the mobile user to a base station (BS). The base station (BS) serves as a wireless access point for mobile users. TCP/IP is part of the Internet protocol suite which is a set of communications protocols that implement the protocol stack on which the Internet and most commercial networks run. In CDMA 2000 1x or IS-95A/B networks, the wireless link between the mobile station (MS) and the base station (BS) is known as a $U_m$ link. The serial data link (such as RS232 or USB) between the terminal equipment (TE) and the mobile station (MS) is known as the $R_m$ link. For embedded data calls, only the $U_m$ link is present, whereas for tethered data calls, both $U_m$ and $R_m$ links are present.

As shown in FIG. 2, tethered data calls are further classified into two models: a relay model and a network model. In the relay model, there is one Point-to-Point Protocol (PPP) link between the terminal equipment (TE) and the packet data serving node (PDSN). In the relay model, the Point-to-Point Protocol (PPP) does not run on the mobile station (MS) since it serves only as a relay function for the PPP link. In the network model, one PPP link runs on the link between the terminal equipment (TE) and the mobile station (MS) while another PPP link runs on the link between the mobile station (MS) and the packet data serving node (PDSN).

In one aspect, the CDMA 2000 1xEVDO wireless standard includes a set of protocols known as packet apps to transport packets over the wireless network. These protocols include, for example, radio link protocol (RLP), location update protocol (LUP), flow control protocol (FCP), etc. In the CDMA 2000 1xEVDO wireless standard, Rev. 0, the default packet app (DPA) was introduced. In the CDMA 2000 1xEVDO wireless standard, Rev. A, the multi-flow packet app (MPA) and the enhanced multi-flow packet app (EMPA) were introduced. In the CDMA 2000 1xEVDO wireless standard, Rev. B, the multi-link multi-flow packet app (MMPA) was introduced. In the default packet app (DPA) and the multi-flow packet app (MPA), all packets that are transferred over the wireless link employ Point-to-Point Protocol (PPP) over radio link protocol (RLP) with high-level data link control (HDLC) framing (via PPP). Here, the radio link protocol (RLP) does not provide framing. In the enhanced multi-flow packet app (EMPA) and multi-link multi-flow packet app (MMPA), not all packets that are transferred over the wireless link employ PPP over RLP. In the enhanced multi-flow packet app (EMPA) and multi-link multi-flow packet app (MMPA), some packets that are transferred over the wireless link employ Internet protocol (IP) over RLP, with RLP framing instead of HDLC framing via PPP.

There are at least two types of default link flows in EMPA and in MMPA for transferring best effort traffic: The first type of default link flows is Flow 0 in which the packets are transferred over the wireless link employing PPP over RLP and is HDLC-framed (via PPP). The second type of default link flows is Flow 1 in which the packets are not HDLC framed. The packets which are transferred over the wireless link employ IP over RLP, with RLP framing instead of HDLC framing via PPP. In one aspect, Flow 0 is used for PPP signaling (such as link setup, authentication, keepalives, etc.) and Flow 1 is used for data transfer.

In the EMPA and in the MMPA Flow 1 with relay-model tethered data calls, the terminal equipment (TE) expects to employ PPP as a link layer protocol but the link between the mobile station and the PDSN employs IP over RLP without the use of PPP. On the forward link, the terminal equipment (TE) expects PPP packets, but instead receives IP packets from the mobile station (MS). On the reverse link, the terminal equipment (TE) transmits PPP packets, but the PDSN expects to receive IP packets. This results in an incompatibility between the relay model tethered data calls in the terminal equipment (TE) and the usage of EMPA or MMPA Flow 1 because the packets are transferred over the wireless link employing IP over RLP. Unlike the embedded data calls where the TCP/IP protocol stack runs on the mobile station (MS) itself, for tethered data calls, the TCP/IP protocol stack runs on the TE and the TE does not employ DPA, MPA, EMPA, MMPA, etc. Without additional algorithms, the service providers have two undesirable alternatives: to provision the mobile station (MS) not to support relay-model tethered data calls or to provision the mobile station (MS) not to support EMPA or MMPA packet flows.

Figure 3:
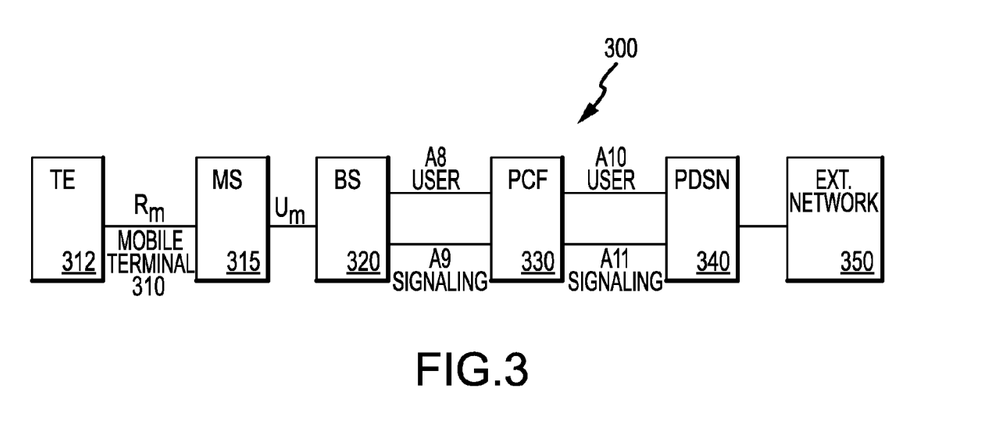
FIG. 3 illustrates an example of a wireless network which interconnects a mobile terminal with an external network.

FIG. 3 illustrates an example of a wireless network 300 which interconnects a mobile terminal 310 with an external network 350. In one aspect, the mobile terminal 310 includes a terminal equipment (TE) 312 and a mobile station (MS) 315. In one example, the terminal equipment (TE) 312 is a personal computer (PC), a laptop computer or a personal digital assistant (PDA), etc. One skilled in the art would understand that the examples of terminal equipments mentioned are not exclusive and that other examples may be used without affecting the spirit or scope of the disclosure. In one case, the mobile station (MS) 315 serves as a wireless modem for the terminal equipment (TE) 312.

As shown in FIG. 3, the mobile station (MS) 315 is interconnected to a base station (BS) 320 via a wireless link $U_m$. In one example, the wireless link $U_m$ is based on the CDMA 2000 1x or IS-95A/B wireless standard. In another example, the wireless link $U_m$ is based on the CDMA 2000 1xEVDO wireless standard.

As shown in FIG. 3, the base station (BS) 320 is interconnected to a packet control function (PCF) 330 via two interfaces A8 and A9. A8 is the user traffic interface and A9 is the signaling interface. The packet control function (PCF) 330 is part of the radio access network (RAN) that manages the relay of packets between the base station (BS) 320 and the packet data serving node (PDSN) 340. The packet control function (PCF) 330 is interconnected to the packet data serving node (PDSN) 340 via two interfaces A10 and A11. A10 is the user traffic interface and A11 is the signaling interface. The packet data serving node (PDSN) 340 serves as the gateway to external networks. For example, the packet data serving node (PDSN) 340 is connected to the external network 350, e.g., the Internet, via standard IP interfaces.

Figure 4:
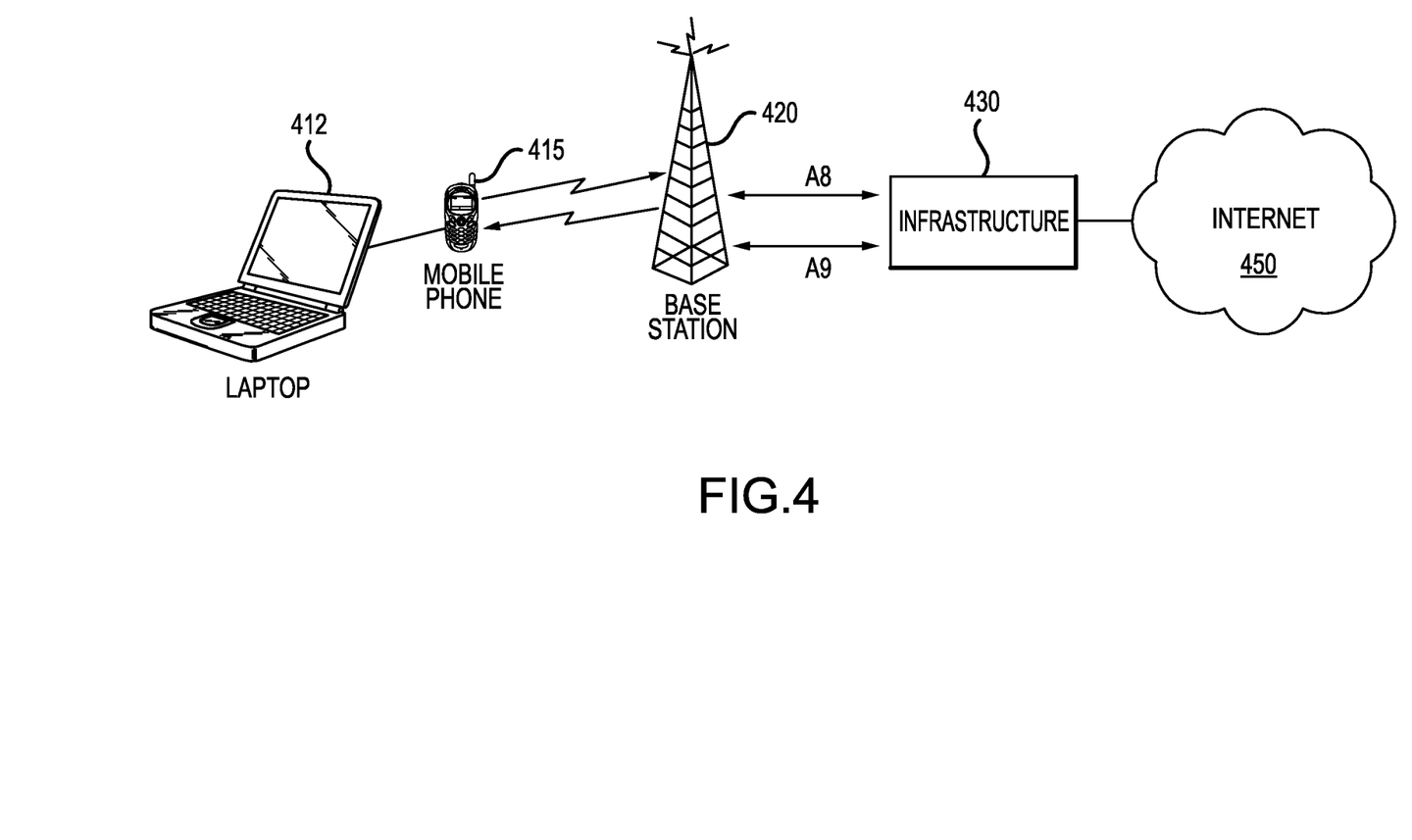
FIG. 4 illustrates an example of a wireless network which interconnects a computer laptop with the Internet.

FIG. 4 illustrates an example of a wireless network which interconnects a computer laptop with the Internet. As shown in FIG. 4, the terminal equipment TE is a computer laptop 412 and the mobile station is a mobile phone 415. The mobile phone 415 is interconnected to a base station (BS) 420 via a wireless link $U_m$. In turn, the base station (BS) 420 is interconnected via the two interfaces A8 and A9 to an infrastructure 430 for supporting access to the Internet 450. The infrastructure 430 serves as the gateway to the Internet 450.

Figure 5:
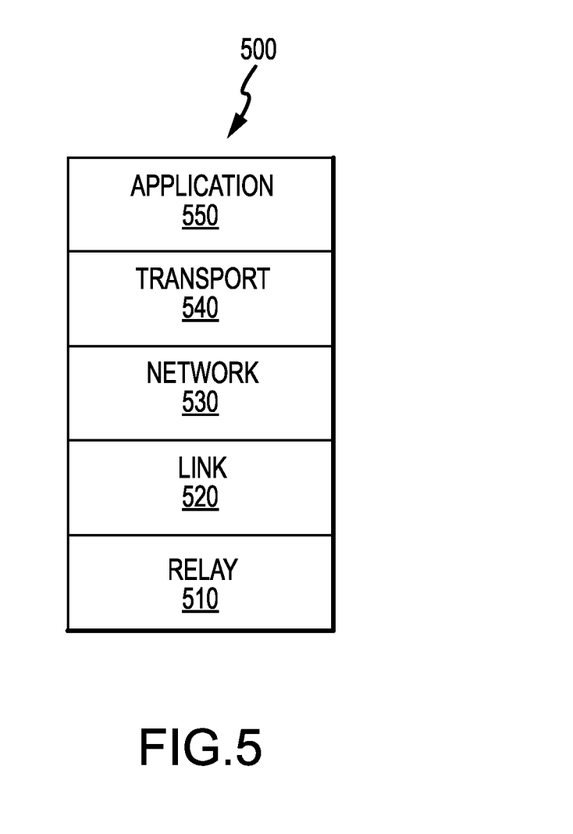
FIG. 5 illustrates an example of a five layer protocol stack.

Internetworking between various user devices which employ a variety of relay layer protocols and applications is facilitated by the usage of a common internetworking protocol within the protocol stack. The protocol stack is an idealized model of the processes used in internetworking between various user devices. One example of a protocol stack is the seven layer model proposed for Open System Interconnection (OSI) by the International Standards Organization (ISO). However, a simplified example of a five layer protocol stack 500 is the five layer model illustrated in FIG. 5. As shown in FIG. 5, the lowest layer is denoted the relay layer 510 which is responsible for the transport of bits across a communications interface, either wired or wireless. Examples of relay layer protocols include, but are not limited to, EIA-232 (for serial data transfer), Ethernet, CDMA 2000 1xEVDO, GSM, GPRS, UMTS, WiMax, etc.

The next layer above the relay layer 510 in the protocol stack is the link layer 520 which groups a series of bits into frames over a point-to-point link. Each frame consists of framing bits to help demarcate each frame. In one example, the link layer is based on the Point-to-Point Protocol (PPP). The next layer above the link layer 520 is the network layer 530 which forms packets with addressing to facilitate internetworking across disparate data networks. In one example, the network layer 530 is based on the Internet Protocol (IP). Above the network layer 530 is the transport layer 540 which is responsible for reliable end-to-end data transport. Two examples of transport protocols are Transmission Control Protocol (TCP) and User Datagram Protocol (UDP). Above the transport layer 540 the user applications are carried on the top layer, i.e., application layer 550, of the protocol stack 500.

Figure 6:
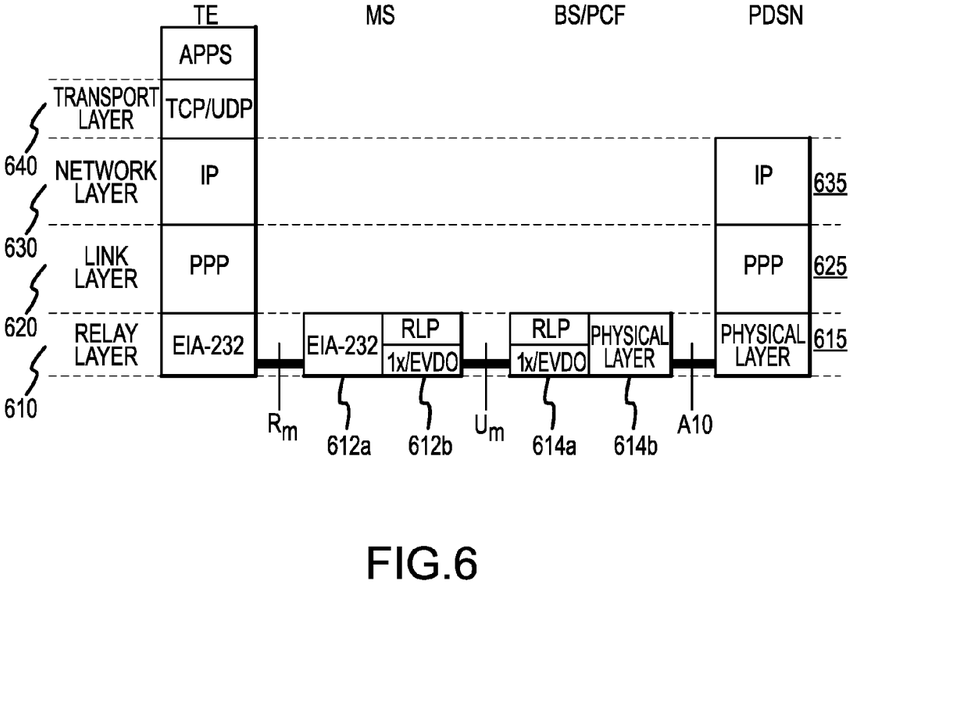
FIG. 6 illustrates an example of a tethered relay data call for Flow 0.

FIG. 6 illustrates an example of a tethered relay data call for EMPA and MMPA Flow 0. As shown in FIG. 6, the terminal equipment (TE) includes a protocol stack where some user application is carried over a transport layer 640, for example, transmission control protocol (TCP) or user datagram protocol (UDP). The transport layer 640 is carried over a network layer 630, for example, IP. The network layer 630 is carried over a link layer 620, for example, PPP. The link layer 620 is carried over a relay layer 610, for example, EIA-232 serial data transfer across the $R_m$ link to the mobile station (MS).

The mobile station relay layer 612a is compatible with the terminal equipment (TE) relay layer 610 on one direction, e.g., EIA-232. The mobile station relay layer 612b is also compatible with the BS/PCF relay layer 614a in the other direction, e.g., RLP/1xEVDO. The RLP/1xEVDO interface is carried over the wireless link, $U_m$. The BS/PCF physical layer 614b is also compatible with the PDSN physical layer 615 over the interface A10. The PDSN for Flow 0 data calls has a protocol stack where the network layer 635, for example, IP is carried over a link layer 625, for example, PPP, as illustrated in FIG. 6. The link layer 625 is carried over a relay layer, for example, the physical layer 615. In the example illustrated in FIG. 6, a PPP data call is interconnected between the terminal equipment (TE) and the PDSN.

Figure 7:
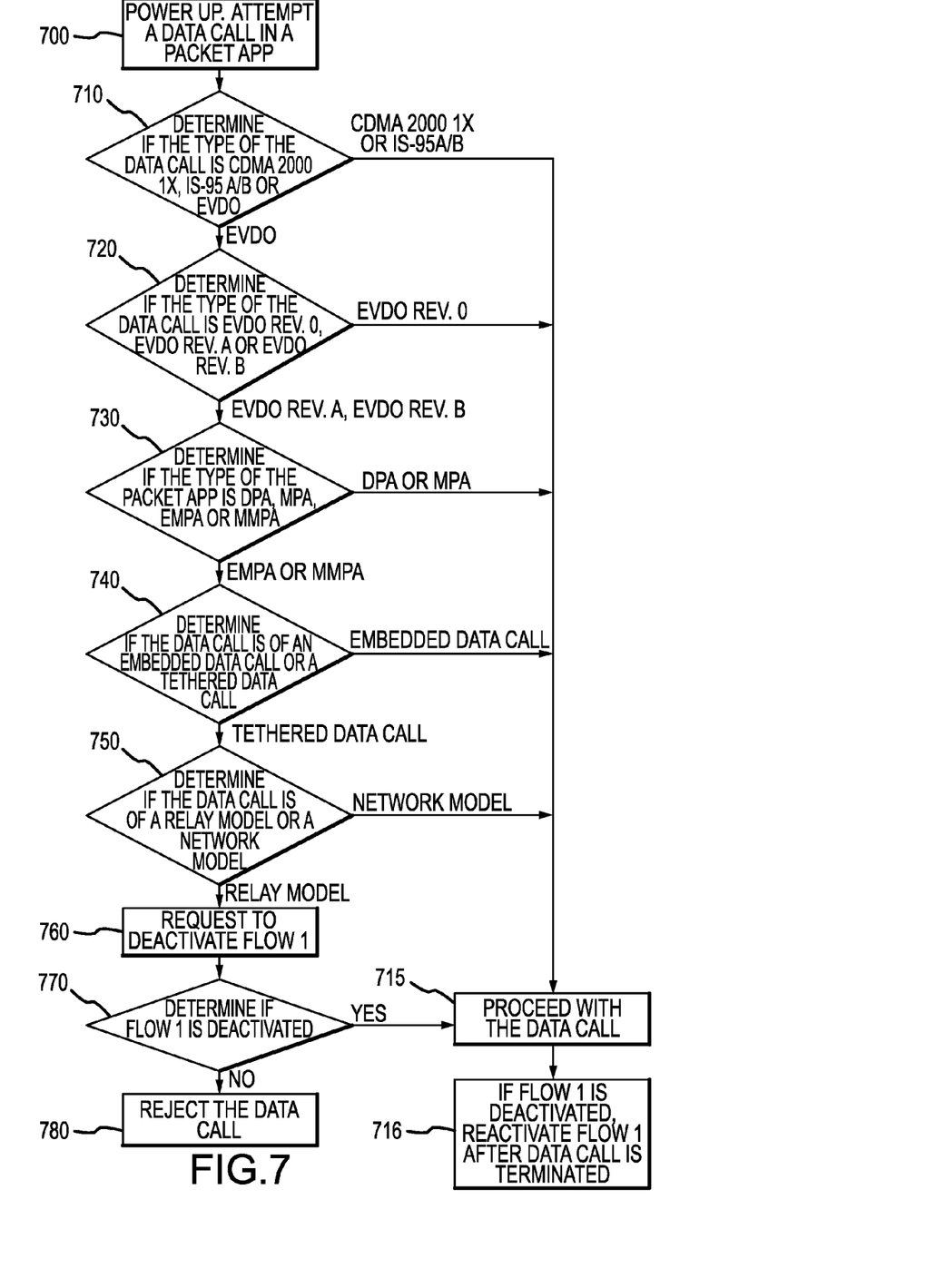
FIG. 7 is a flow diagram of an example algorithm for allowing EMPA and MMPA packet flows to be supported for relay-model tethered data calls.

FIG. 7 is a flow diagram of an example algorithm for allowing EMPA and MMPA packet flows to be supported for relay-model tethered data calls. In one aspect, the algorithm of FIG. 7 is employed when a tethered data call is originated or terminated by the terminal equipment (TE). In one aspect, the algorithm determines if a relay-model tethered data call is initiated.

In block 700, power up, for example, a mobile station (MS) is powered up. And, in block 700, a data call in a packet app is attempted. In block 710, determine the type of the data call. If the data call type is CDMA 2000 1x or IS-95A/B, go to block 715 where all data calls in the packet app are allowed to proceed. In block 710, if it is determined that the data call type is EVDO, go to block 720. In block 720, determine if the type of the data call is EVDO Rev. 0, EVDO Rev. A or EVDO Rev. B. If the type of the data call is EVDO Rev. 0, go to block 715 where all data calls in the packet app are allowed to proceed. If the type of the data call is EVDO Rev. A or EVDO Rev. B, go to block 730 and determine the type of the packet app. If the packet app is DPA or MPA, go to block 715 where all data calls in the packet app are allowed to proceed. If the packet app is EMPA or MMPA, go to block 740. In block 740, determine if the data call is an embedded data call or a tethered data call. If the data call is an embedded data call, go to block 715 where all data calls in the packet app are allowed to proceed. If the data call is a tethered data call, go to block 750 and determine if the data call is a relay model tethered data call or a network model tethered data call (i.e., determine if the data call is of a relay model or of a network model). If the data call is a network model tethered data call, go to block 715 where all data calls in the packet app are allowed to proceed. If the data call is a relay model tethered data call, go to block 760. In block 760, request to deactivate Flow 1. In block 770, determine if Flow 1 is deactivated. If Flow 1 is deactivated, then all data calls in the packet app are allowed to proceed as indicated by block 715. In one example, Flow 1 is deactivated by a base station (BS). In one example, if the base station (BS) does not agree to deactivate Flow 1 or cannot deactivate Flow 1, and Flow 1 is not deactivated, the relay model tethered data call is then rejected in block 780. One skilled in the art would understand that the example algorithm described in FIG. 7 can be repeated for each data call attempted and that the step of powering up, such as powering up the mobile station (MS), in block 700 is not necessary with each data call attempted. Additionally, following block 715, in block 716, if Flow 1 is deactivated, reactivate Flow 1 after the data call is terminated. In one example, a base station (BS) reactivates Flow 1.

One skilled in the art would understand that the flow diagrams, logical blocks and/or modules described herein may be implemented by various ways such as in hardware, firmware, software or a combination thereof. For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks and/or modules described herein may also be coded as computer-readable instructions carried on any computer-readable medium known in the art.

Figure 8:
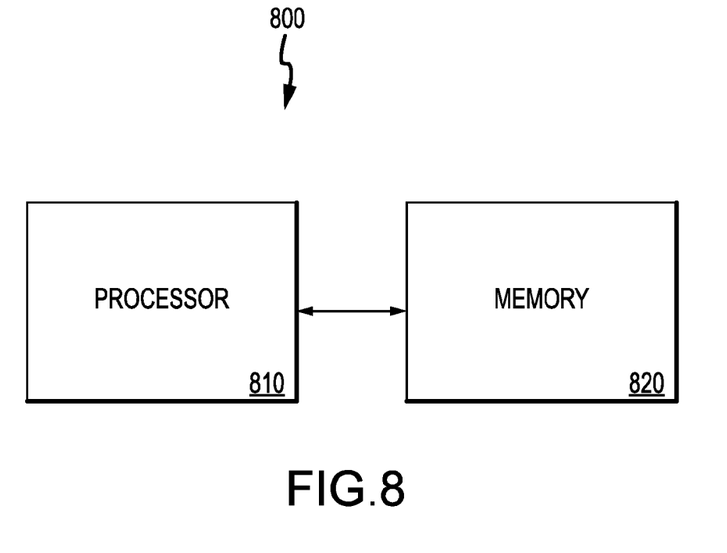
FIG. 8 shows an example of a device comprising a processor in communication with a memory for executing the processes for enabling relay-model tethered data calls in wireless networks.

In one example, the illustrative flow diagrams, logical blocks and/or modules described herein is implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 8 shows an example of a device 800 comprising a processor 810 in communication with a memory 820 for executing the processes for enabling relay-model tethered data calls in wireless networks. In one example, the device 800 is used to implement the algorithm illustrated in FIG. 7. In one example, the memory 820 is located within the processor 810 while in another example, the memory 820 is external to the processor 810. In one aspect, the device 800 is a mobile station. In another aspect, the device 800 is a mobile terminal comprising a mobile station and a terminal equipment. In yet another aspect, the device 800 is a packet control function (PCF) or a packet data serving node (PDSN).

Figure 9:
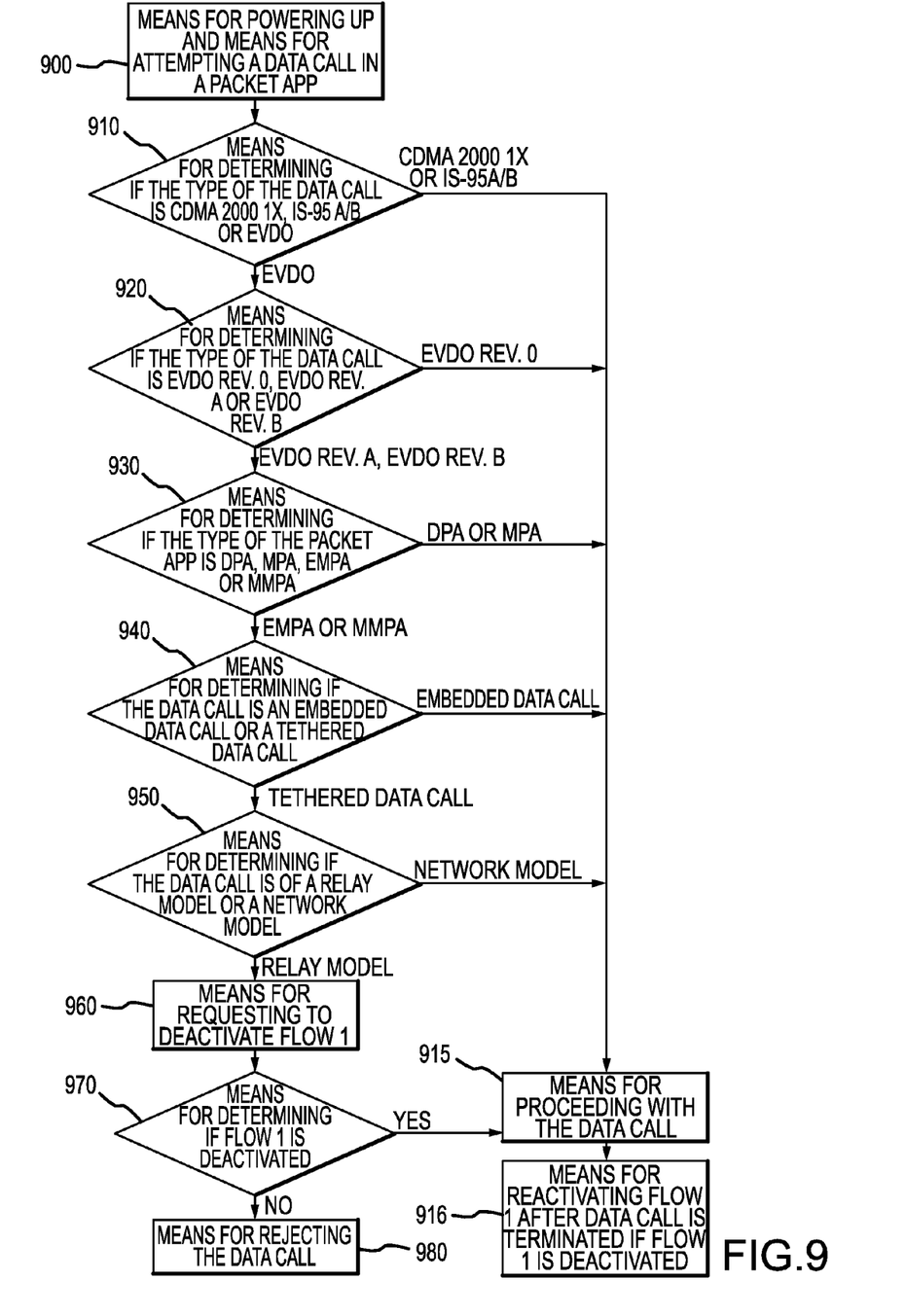
FIG. 9 shows an example of a device suitable for enabling relay-model tethered data calls in wireless networks.

FIG. 9 shows an example of a device 900 suitable for enabling relay-model tethered data calls in wireless networks. In one aspect, the device 900 is implemented by at least one processor comprising one or more modules configured to provide different aspects of enabling relay-model tethered data calls in wireless networks as described herein in blocks 900, 910, 915, 916, 920, 930, 940, 950, 960, 970 and 980. For example, each module comprises hardware, firmware, software, or any combination thereof. In one aspect, the device 900 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method of enabling relay-model tethered data calls, comprising the steps of:
    determining, by a processor at a mobile terminal, if a data call on a wireless network which supports an enhanced multi-flow packet application (EMPA) or a multi-link multi-flow packet application (MMPA) is a relay-model tethered type of data call originated by a tethered equipment that is separate from a base station and is separate from and in communication with the mobile terminal;
    determining, by the processor at the mobile terminal, if a default link flow type is Flow 1;
    requesting, by the processor at the mobile terminal, that the base station deactivates Flow 1, if the data call is of the relay-model tethered type and the default link flow type is Flow 1, thereby enabling relay-model tethered data calls over wireless networks using EMPA and MMPA; and
    proceeding with the data call when Flow 1 is deactivated.

2. The method of claim 1, further comprising reactivating Flow 1 after the data call is completed.

3. A method of enabling a data call in a packet application of a wireless network, comprising the steps of:
    determining, by a processor at a mobile terminal, if a data call type of the data call is CDMA 2000 1X, IS-95A/B or EVDO (evolution-data optimized);

if the data call type is EVDO, further determining, by the processor at the mobile terminal, if the data call type is EVDO Rev. 0, EVDO Rev. A, or EVDO Rev. B;

if the data call type is EVDO Rev. A or EVDO Rev. B, determining, by the processor at the mobile terminal, if a packet application type is one of a default packet application (DPA), a multi-flow packet application (MPA), an enhanced multi-flow packet application (EMPA) or a multi-link multi-flow packet application (MMPA);

if the packet application type is EMPA or MMPA, determining if the data call is a tethered data call or an embedded data call;

if the data call is a tethered data call, determining, by the processor at the mobile terminal, if the data call is of a relay-model tethered type of data call or of a network model;

if the data call is of the relay-model tethered type of data call originated by a tethered equipment that is separate from a base station and is separate from and in communication with the mobile terminal, requesting, by the processor at the mobile terminal, that the base station deactivates default link flow type Flow 1; and proceeding with the data call when default link flow type Flow 1 is deactivated.

4. A mobile terminal for enabling relay-model tethered data calls, comprising:

first means for:

determining if a data call on a wireless network which supports an enhanced multi-flow packet application (EMPA) or a multi-link multi-flow packet application (MMPA) is a relay-model tethered type of data call originated by a tethered equipment that is separate from a base station and is separate from and in communication with the mobile terminal;

determining if a default link flow type is Flow 1;

requesting that the base station deactivates Flow 1, if the data call is of the relay-model tethered type and the default link flow type is Flow 1, thereby enabling relay-model tethered data calls over wireless networks using EMPA and MMPA; and proceeding with the data call when Flow 1 is deactivated; and second means for storing program code executable by the first means.

5. The mobile terminal of claim 4, wherein the first means is configured to request Flow 1 is reactivated after the data call is completed.

6. A communication device, comprising:

a processor; and a memory, the memory containing program code executable by the processor for enabling relay-model tethered data calls, the program code including:

at least one instruction operable for determining if a data call on a wireless network which supports an enhanced multi-flow packet application (EMPA) or a multi-link multi-flow packet application (MMPA) is a relay-model tethered type of data call originated by a tethered equipment that is separate from a base station and is separate from and in communication with the communication device;

at least one instruction operable for determining if a default link flow type is Flow 1;

at least one instruction operable for requesting that the base station deactivates Flow 1, if the data call is of the relay-model tethered type and the default link flow type is Flow 1, thereby enabling relay-model tethered data calls over wireless networks using EMPA and MMPA; and at least one instruction operable for proceeding with the data call when Flow 1 is deactivated.

7. The communication device of claim 6, wherein the program code further comprises at least one instruction for reactivating Flow 1 after the data call is completed.

8. A computer program product having instructions recorded on a non-transitory computer readable medium and executable on a computer of a mobile terminal, comprising code for:

determining if a data call on a wireless network which supports an enhanced multi-flow packet application (EMPA) or a multi-link multi-flow packet application (MMPA) is a relay-model tethered type of data call originated by a tethered equipment that is separate from a base station and is separate from and in communication with the mobile terminal;

determining if a default link flow type is Flow 1;

requesting that the base station deactivates Flow 1, if the data call is of the relay-model tethered type and the default link flow type is Flow 1, thereby enabling relay-model tethered data calls over wireless networks using EMPA and MMPA; and proceeding with the data call when Flow 1 is deactivated.

9. The computer program product of claim 8, wherein the instructions further comprise code for reactivating Flow 1 after the data call is completed.

* * * * *